United States Patent [19]
Langford

[11] Patent Number: 5,875,318
[45] Date of Patent: Feb. 23, 1999

[54] APPARATUS AND METHOD OF MINIMIZING PERFORMANCE DEGRADATION OF AN INSTRUCTION SET TRANSLATOR DUE TO SELF-MODIFYING CODE

[75] Inventor: John Steven Langford, Austin, Tex.

[73] Assignee: International Business Machines Corporation, Armonk, N.Y.

[21] Appl. No.: 629,928

[22] Filed: Apr. 12, 1996

[51] Int. Cl.[6] ............................................. G06F 9/455
[52] U.S. Cl. ...................................... 395/500; 395/707
[58] Field of Search .................................. 395/500, 490, 395/707; 364/300

[56] References Cited

U.S. PATENT DOCUMENTS

| | | | |
|---|---|---|---|
| 4,667,290 | 5/1987 | Goss et al. | 395/707 |
| 4,794,522 | 12/1988 | Simpson | 395/500 |
| 4,951,195 | 8/1990 | Fogg, Jr. et al. | 395/500 |
| 5,193,180 | 3/1993 | Hastings | 395/575 |
| 5,301,302 | 4/1994 | Blackard et al. | 395/500 |
| 5,307,492 | 4/1994 | Benson | 395/700 |
| 5,313,614 | 5/1994 | Goettelmann et al. | 395/500 |
| 5,432,782 | 7/1995 | Suzuki | 370/60 |
| 5,432,937 | 7/1995 | Tevanian et al. | 395/700 |
| 5,459,854 | 10/1995 | Sherer et al. | 395/500 |
| 5,636,366 | 6/1997 | Robinson et al. | 395/490 |

OTHER PUBLICATIONS

Silberman et al., "An Architectural Framework for Supporting Heterogeneous Instruction–Set Architectures." Computer Magazine, vol. 26, Issue 6, pp. 39–56 Jun. 1993.

*Primary Examiner*—Kevin J. Teska
*Assistant Examiner*—Russell W. Frejd
*Attorney, Agent, or Firm*—Volel Emile

[57] ABSTRACT

The invention provides an instruction set translator for translating a source code executable by a first processor to a target code executable by a second processor. The translation of the source code occurs one instruction at a time. The instruction set translator determines, after a first execution of the target code, whether at least one of the instructions is modified. If an instruction is modified, then only this particular instruction is purged from the target code. This is made possible by the use of a hash table to monitor addresses of all modified instructions. If the address of an instruction is in the hash table, it signifies that the instruction has been modified. To isolate the translation of the modified instruction in the target code, the invention will break up the source code translation just before the modified instruction. This allows for the translation of the modified instruction to occur separately. Consequently, each time the instruction is modified only that instruction is purged from the target code.

18 Claims, 5 Drawing Sheets

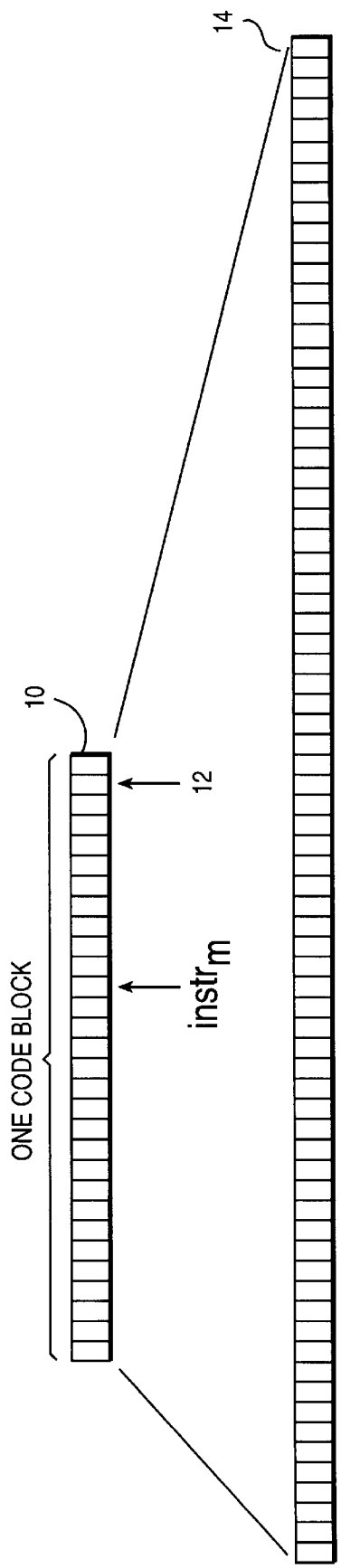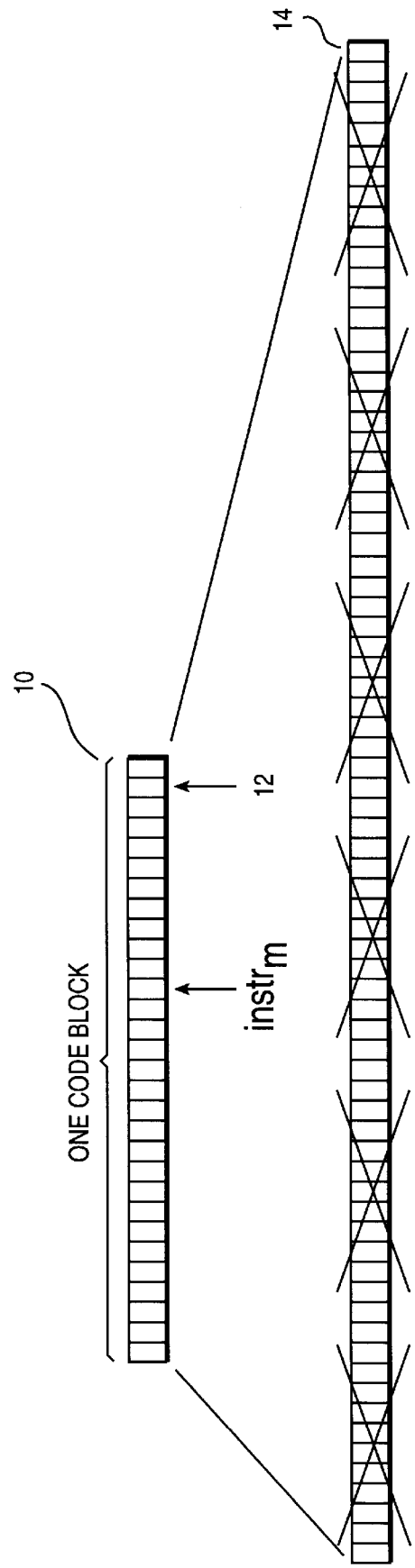
FIG. 2
FIG. 3

APPARATUS AND METHOD OF MINIMIZING PERFORMANCE DEGRADATION OF AN INSTRUCTION SET TRANSLATOR DUE TO SELF-MODIFYING CODE

BACKGROUND OF THE INVENTION

1. Field of the Invention

The present invention relates generally to instruction set translators and more particularly to the reduction of performance degradation of an instruction set translator due to self-modifying code.

2. Description of the Related Art

An executable program that is designed to be executed by a certain processor (i.e., a source processor) may be able to be executed by a different processor (i.e., a target processor) with the aid of either an instruction set interpreter or an instruction set translator. An instruction set interpreter, (running on the target processor), fetches an instruction from the source processor code, interprets the instruction and executes the necessary code to mimic the behavior of the source processor. Then, the instruction set interpreter fetches the next instruction, interprets it and executes its equivalent and so on until a halt instruction is encountered or the user aborts the process. The instruction interpretations are not stored and thus, the instruction set interpreter fetches and interprets the source code as often as the code is encountered.

An instruction set translator, on the other hand, translates blocks of the source code and stores them for subsequent executions. The resulting set of code generated, in this instance, is referred to as a code block. The code block can potentially contain the translation of hundreds of source code instructions. After the code block translation is stored, it can be executed as often as needed, thus, eliminating subsequent translation steps. Consequently, emulation of an executable program by means of an instruction set translator is usually faster and more efficient than using an instruction set interpreter.

Nevertheless, when "self-modifying code" is embedded in a source code, the performance of an instruction set translator may be degraded to such an extent that it becomes as slow as, or slower than, an instruction set interpreter. A "self-modifying code" is a technique used by programmers to increase the processing speed of executable programs. For example, an address of a memory transfer operation in a graphics environment (i.e., the operand of the transfer instruction) may be explicitly incremented while looping through video memory. This allows the code to be executed faster since the operand of the instruction is itself being modified thus bypassing potentially several memory accesses. This technique, however, decreases the performance of the instruction set translator because at each iteration, the self-modifying code causes the instruction set translator to purge the translated code and retranslate the entire code block containing the modified instruction. Consequently, the instruction set translator will spend most of its time translating source processor code rather than executing already translated code.

Thus, there is a need in the art for an apparatus and method of isolating instructions that have been modified from those that have not such that only the translations of the modified instructions are purged and retranslated by an instruction set translator.

SUMMARY OF THE INVENTION

The need in the art is addressed by the present invention. The invention is an instruction set translator for translating a source code executable by a first processor to a target code executable by a second processor. The translation of the source code occurs one instruction at a time. The instruction set translator determines, during execution of the target code, whether at least one of the instructions is modified. If an instruction is modified, then only this particular instruction is purged from the target code. This is made possible by the use of a hash table to monitor addresses of all modified instructions. If the address of an instruction is in the hash table, it signifies that the instruction has been modified. To isolate the translation of the modified instruction in the target code, the invention will break up the source code translation just before the modified instruction. This allows for the translation of the modified instruction to occur separately. Consequently, each time the instruction is modified only that instruction is purged from the target code.

BRIEF DESCRIPTION OF THE DRAWING

FIG. 2 illustrates a block of a source code and its resulting translation.

FIG. 3 illustrates the purging of the translated source code due to self-code modification.

DESCRIPTION OF THE INVENTION

Figure 1:
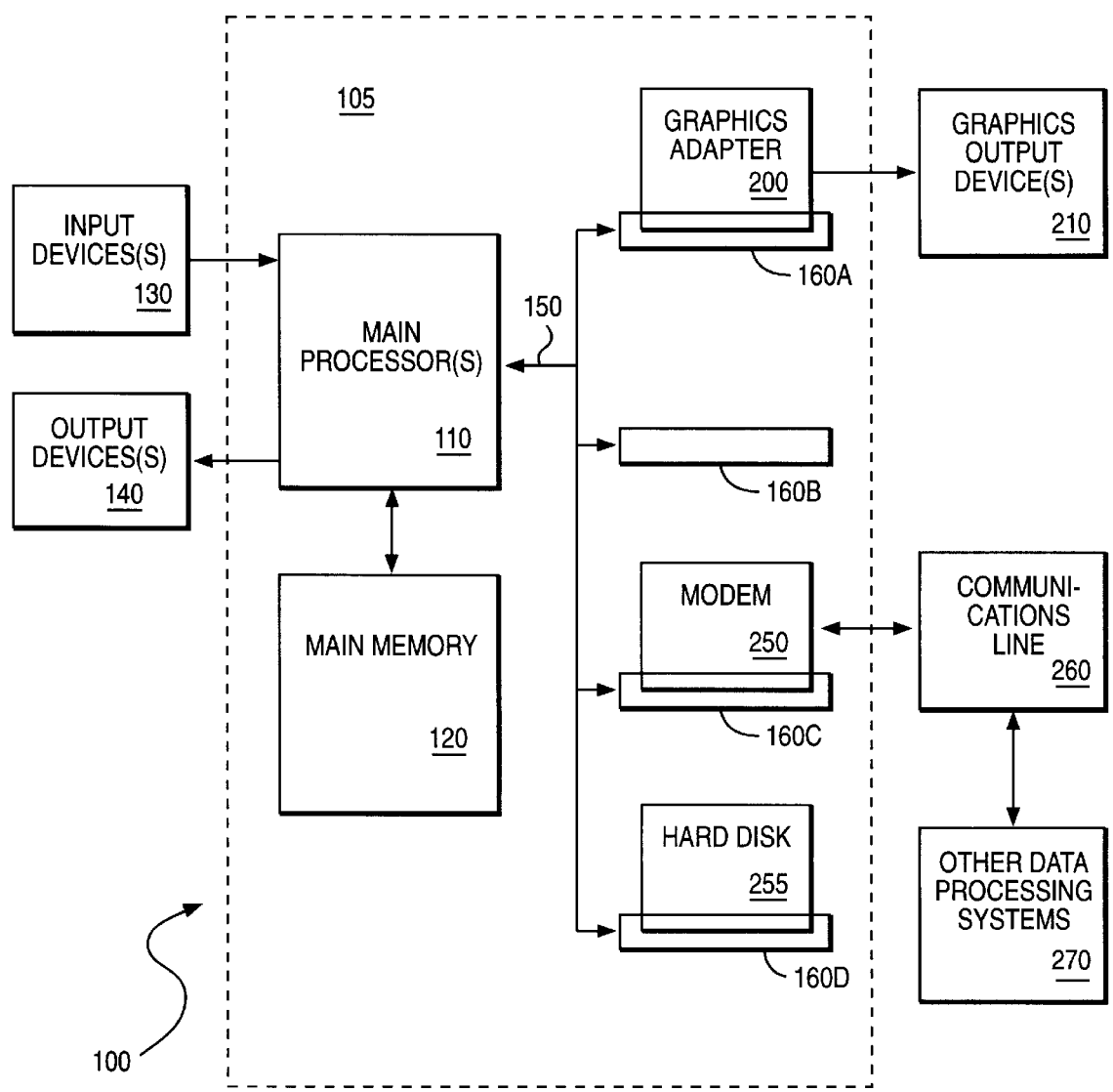
FIG. 1 is a block diagram of a digital computer utilized by a preferred embodiment of the invention.

FIG. 1 is a block diagram of a digital computer 100 utilized by a preferred embodiment of the invention. The computer includes main processor(s) 110 coupled to a main memory 120 in computer box 105 with input device(s) 130 and output device(s) 140 attached. Input devices(s) 130 may include a keyboard, mouse, tablet or other types of input devices. Output device(s) 140 may include a text monitor, plotter or other types of output devices. The main processor (s) 110 may also be coupled to graphics output device(s) 210 such as a graphics display through a graphics adapter 200. The graphics adapter 200 may be located in an adapter slot 160A. The graphics adapter 200 receives instructions regarding graphics from the main processor(s) 110 on bus 150. A modem or other communications adapter 250 and a hard disk 255 may also be located in slots 160C and 160D to provide communications with the main processor(s) 110 across bus 150. Modem 250 may communicate with other data processing systems 270 across communications line 260. The main memory 120, hard disk 255 and floppy disks are referred here as memory.

In this case, the main processor 110 is a target processor processing a source code designed for a source processor. The execution of the source code may be facilitated by an instruction set translator. U.S. Pat. No. 5,313,614, the disclosure of which is hereby incorporated by reference, discloses an implementation of an instruction set translator at columns 15–31. The instruction set translator will first translate blocks of the source code to the target code before providing it to the processor 110 for execution. The source code, target code and instruction set translator all reside in memory.

FIG. 2 illustrates a block of source code and its resulting translation. Source code 10 is made of a sequence of instructions which comprise instruction 12 and instruction (m). Instruction 12 modifies instruction (m). This modification may be in the form of incrementing or using a different register to store a particular data each time the code is executed. For example, the basic instruction of instruction (m) may be to copy the contents of a register into memory using another register and an offset to form the address of the memory store such as: copy $C_x$ $D_s$ i, where $C_x$ is the register from which the data will be copied, $D_s$ is the register containing the base address of the data and (i) is an offset to $D_s$. Instruction 12 may be incrementing the offset (i). Therefore each time the code is executed, the content of register $C_x$ is copied into a different memory location.

This technique is very useful in graphics systems. For instance, to show that a particular object on a screen is moving, the data representing the object must continually be copied or moved from one location in the display memory to another. Using the example above, if (i) were to be incremented from zero to ten in increments of one, the motion of the object represented by the data in register $C_x$ may follow a horizontal path on the screen. The horizontal path is due to the data being sent to successive display memory locations ($D_s$ i) corresponding to successive locations on the screen. Note that, the data will have to be erased from each preceding display memory location before being displayed.

Target code 14 is the translation of source code 10. The state information, x-registers etc. of the source processor must be emulated by the target processor for the execution of the target code 14 to be comparable to the execution of the source code 10. Thus, target code 14 is usually longer than the source code 10.

FIG. 3 illustrates the purging of the target code 14 due to self-code modification. The "Xs" across target code 14 indicates the purging of code 14. In operation, the instruction set translator translates source code 10 to target code 14, stores and executes target code 14 at j=0, where j is the number of times the code is executed. During execution of target code 14, the execution of the translation corresponding to instruction 12 modifies the contents of the source's memory where instruction (m) resides thus invalidating the translation 14. This causes target code 14 to be immediately purged. At j=1, the instruction set translator retranslates source code 10, since it was purged when instruction 12 modified instruction(m) to take into account the modification of instruction (m) and stores the retranslation. This process will reoccur each time the code is executed. Accordingly, the instruction set translator may be likened to an instruction set interpreter since the source code is translated each time the code is executed. Indeed, depending on the number of times the code is executed, the instruction set translator may perform slower than the instruction set interpreter due to the continual storing and purging of code 14.

Figure 4:
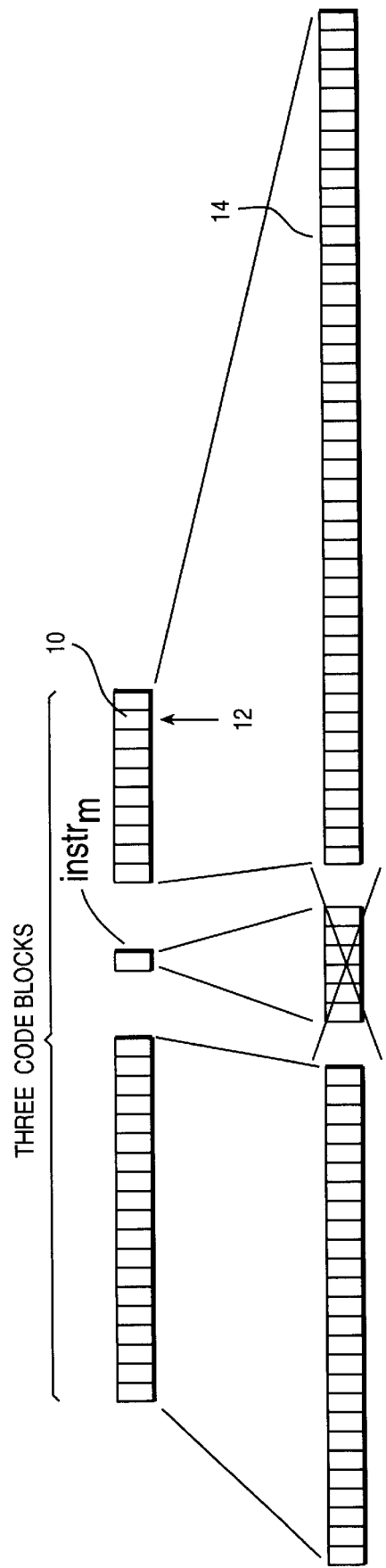
FIG. 4 illustrates the isolation of a modified instruction from the rest of a source code in accordance with the invention.

FIG. 4 illustrates the isolation of the translation of the modified instruction (m) from the rest of the target code 14 in accordance with the invention. At j=1, the invention will isolate the translation of instruction (m) which has been modified during the execution of the code at j=0. The isolation of the modified instruction (m) will result in the original code block being divided into three code blocks as shown in FIG. 4. This, then, facilitates the purging of only the translation of instruction (m) from the target code 14. Consequently, the invention greatly diminishes the performance degradation of instruction set translators due to self-modifying code.

Figure 5:
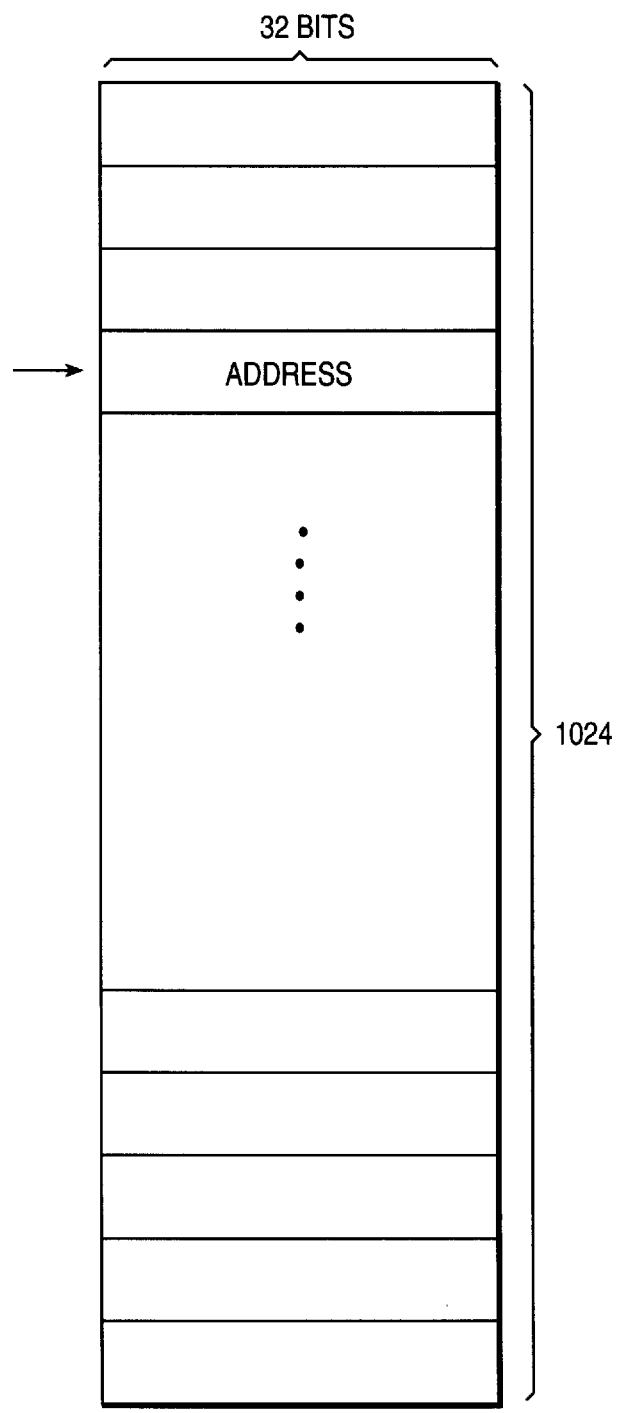
FIG. 5 is an illustration of a hash table used by an embodiment of the invention.

To monitor the instruction modifications, the invention may use a hash table. FIG. 5 is an illustration of a hash table used by an embodiment of the invention. The hash table may be able to contain 1024 entries of 32 bits each. To reference the address of the modified instruction in the hash table, the invention strips off the ten lower bits of the address of the modified instruction. These ten bits are shifted two bits to the right and the result is used as an index to the table. For example, if the lower ten bits of the address of instruction (m) is 3FC or 11 1111 1100, they are shifted two bits to the right to become 0FF or 00 1111 1111. These bits are then used to reference the location at which the address of instruction (m) is entered in the table. It should be noted that although a particular hashing algorithm is disclosed, many other hashing (or non-hashing) algorithms may be used without departing from the scope of the invention.

When addresses of two modified instructions have a similar hashing result (i.e., when they have the same lower ten bits), the invention uses the last address stored at the location referenced by the bits. When there are more than two addresses with the same hashing result, all the instructions in the source code 10 may have to be retranslated. In practice this does not seem to occur very often.

Figure 6:
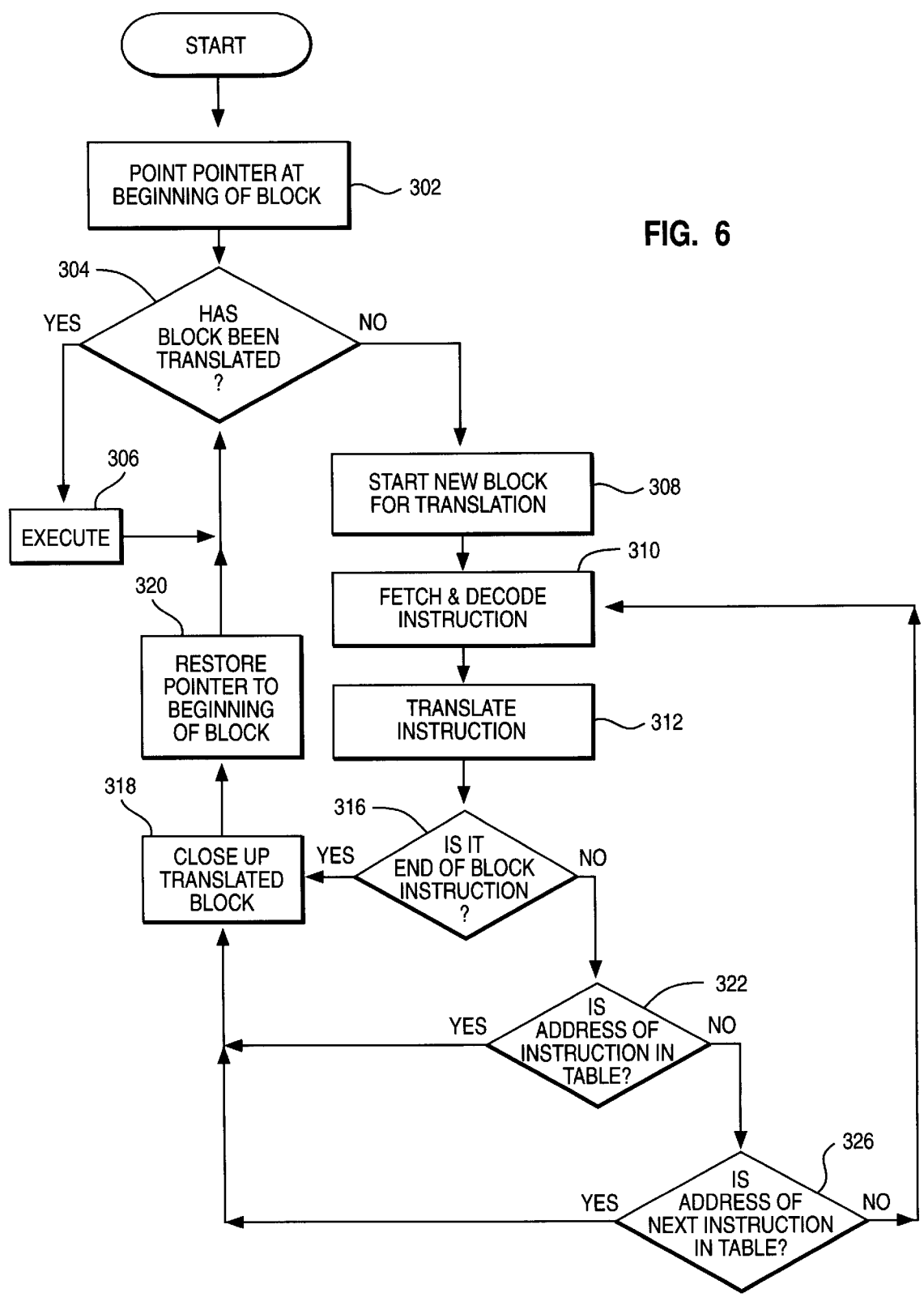
FIG. 6 is a flow chart illustrating the process used by a preferred embodiment of the invention in isolating a translated modified instruction from a translated block instruction.

FIG. 6 is a flow chart illustrating the process used by a preferred embodiment of the invention in isolating a translated modified instruction from a translated block instruction. At step 302, a pointer is pointed to the beginning of a block of code to be translated, then a check is made to determine whether the block has been translated at step 304. This check is easily performed since instructions modifying PC memory have a code that checks whether or not the affected storage location corresponds to PC memory containing currently translated source code. If the block has already been translated, the processor then executes the translated block, step 306. If the block has not been translated, at step 308 the block is readied for translation by using a header or prefix to indicate the beginning of a translated block. At step 310, an instruction is fetched and decoded. The decoded instruction is then translated, step 312. The instruction is also checked to determine whether it is an end of block instruction such as a "RET" (return) or an "IRET" (return from interrupt) at step 316. If it is an end of block instruction, a suffix is appended to the translated block to indicate the end of the translated block, step 318. At step 320, the pointer is returned to the beginning of the block then the process that begins at step 304 is repeated. This time when the check at step 304 is performed, the answer will be true and the translated block will be executed at step 306.

If the result of the check at step 316 is false, then a check is made to determine whether the address of the instruction to which the pointer points is in the hash table, step 322. If the address is in the table then the process beginning at step 318 is performed. If the address is not in the hash table, then the pointer is set to point to the next source code instruction. Again, a check is made to determine whether the address of the instruction is in the hash table (step 326). If the answer is yes, step 318 is performed. If the answer is no, the process returns to step 310.

In operation, the first time the source code is to be executed using the target processor, an entire block of instructions is translated and stored to be executed later. During execution of the translated block, the modification of the instruction will occur. When that occurs, the address of the modified instruction is entered in the hash table and the whole translated code block is purged. Before the second execution of the source code, the block of instructions will again be translated since the check at step 304 will yield a negative answer as the translated code was purged. However, the translated code will be broken up into two or more groups (i.e., a group of non-modified instructions, a modified instruction and possibly another group of non-modified instructions as shown in FIG. 4).

For example, during the first execution of target code 14, the address of instruction (m) will be entered in the hash table. When the source code 10 is translated for the second time the process beginning at step 310 will be repeated until the next instruction is instruction (m). At that point, the answer to step 326 will be true. Thus, an end of translated block suffix will be appended to the target code 14 just before instruction (m) is translated. This part of the target code 14 will be executed. Then the pointer will point to instruction (m) at step 304. Instruction (m) will be translated. An end of block translation suffix will be appended to the translation of instruction (m) since the check at step 322 will yield a positive answer. Instruction (m) will then be executed. Then the pointer will point to the instruction succeeding instruction (m). The process beginning at step 310 will be repeated until an end of block instruction is reached. When that occurs, the translated instructions will be executed. During execution of this code block, instruction (m) will be modified as per instruction 12 and will be purged.

The first part and the third part of source code 10 will not be retranslated because those source code instructions are no longer in the code block where modification occurred. Instruction (m) will be retranslated since its translation was purged after being modified during the second execution of the third part of the target code 14. It should be understood that instruction (m) will be retranslated before each subsequent execution of the instruction.

Note that when the code detects that a portion of PC memory is modified by means other than an instruction modification (e.g., a disk read), then all the translations having addresses corresponding to that range of PC memory addresses are purged. In addition, all entries in the hash table that fall within that range of PC memory addresses are also removed.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An instruction set translator for translating a source code executable by a first processor to a target code executable by a second processor, said source code being translated into blocks of code of said target code wherein each block includes a plurality of instructions, said translator comprising:

means for translating said source code into said blocks of code of said target code;

means for determining during execution of each block of said target code whether one or more of said plurality of instructions are modified; and means, if said one or more instructions are modified, for marking said one or more modified instructions.

2. The instruction set translator of claim 1 further comprising means, responsive to said marking means, for purging translation of said one or more modified instructions.

3. The instruction set translator of claim 2 further comprising means for storing said target code for subsequent executions.

4. The instruction set translator of claim 3 comprising means for providing for further execution only translated instructions that have not been modified.

5. The instruction set translator of claim 4 further comprising means for retranslating said one or more modified instructions before each subsequent execution.

6. The instruction set translator of claim 5 comprising means for providing for execution translation of said one or more modified instructions.

7. A method of translating a source code executable by a first processor to a target code executable by a second processor, said source code being translated into blocks of code of said target code wherein each block includes a plurality of instructions, said method comprising the steps of:

translating said source code into said blocks of code of said target code;

determining after an execution of each block of said target code whether at least one of said instructions is modified; and marking said at least one modified instruction.

8. The method of claim 7 further comprising means the step of purging translation of said one or more marked instructions.

9. The method of claim 8 further comprising the step of storing said target code for subsequent executions.

10. The method of claim 9 comprising the step of providing for further execution only translated instructions that have not been modified.

11. The method of claim 10 further comprising the step of retranslating said at least one modified instruction before each subsequent execution.

12. The method of claim 8 comprising the step of providing for execution translation of said at least one modified instruction.

13. A computer program product stored in memory executable by a processor for translating a source code executable by a first processor to a target code executable by a second processor, said source code being translated into blocks of code of said target code wherein each block includes a plurality of instructions, said computer program product comprising:

computer readable program code means for translating said source code into said blocks of code of said target code;

computer readable program code means for determining after an execution of each block of said target code whether at least one of said instructions is modified; and computer readable program code means, if said at least one instruction is modified, for marking said modified instruction.

14. The computer program product of claim 13 further comprising computer readable program code means, responsive to said marking means, for purging translation of said one or more modified instructions.

15. The computer program product of claim 14 further comprising computer readable program code means for storing said target code for subsequent executions.

16. The computer program product of claim 15 comprising computer readable program code means for providing for further execution only translated instructions that have not been modified.

17. The computer program product of claim 16 further comprising computer readable program code means for retranslating said at least one modified instruction before each subsequent execution.

18. The computer program product of claim 17 comprising computer readable program code means for providing for execution translation of said at least one modified instruction.

* * * * *